United States Patent
Lisseman et al.

(10) Patent No.: US 8,052,167 B2
(45) Date of Patent: Nov. 8, 2011

(54) AIRBAG ASSEMBLY

(75) Inventors: Jason Carl Lisseman, Shelby Township, MI (US); Kenneth Irving Beaty, Lake Orion, MI (US); Danielle Marie Lipson, Royal Oak, MI (US); Angela Susan Schneider, Waterford, MI (US); Stewart Alexander Murray, Waterford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 377 days.

(21) Appl. No.: 12/213,478

(22) Filed: Jun. 19, 2008

(65) Prior Publication Data

US 2009/0033072 A1 Feb. 5, 2009

Related U.S. Application Data

(60) Provisional application No. 60/929,349, filed on Jun. 22, 2007.

(51) Int. Cl.
*B60R 21/20* (2006.01)
(52) U.S. Cl. .................................. 280/728.2
(58) Field of Classification Search .............. 280/728.2, 280/731, 740
See application file for complete search history.

(56) References Cited

U.S. PATENT DOCUMENTS

| | | | |
|---|---|---|---|
| 5,425,548 A * | 6/1995 | Rasmussen | 280/728.2 |
| 5,468,012 A | 11/1995 | Mihm | |
| 6,149,192 A * | 11/2000 | Swann et al. | 280/740 |
| 6,152,479 A | 11/2000 | Wagener et al. | |
| 6,719,323 B2 * | 4/2004 | Kai et al. | 280/731 |
| 7,083,185 B2 | 8/2006 | Fangmann et al. | |
| 7,311,324 B2 * | 12/2007 | Okada et al. | 280/728.2 |
| 7,331,599 B2 | 2/2008 | Laue et al. | |
| 7,497,468 B2 * | 3/2009 | Choi et al. | 280/740 |
| 2002/0067028 A1 * | 6/2002 | Ostermann et al. | 280/728.2 |
| 2002/0109337 A1 | 8/2002 | Kassman et al. | |
| 2005/0093279 A1 * | 5/2005 | Hauer et al. | 280/740 |
| 2007/0007753 A1 * | 1/2007 | Williams et al. | 280/728.2 |
| 2007/0228703 A1 * | 10/2007 | Breed | 280/735 |
| 2007/0278772 A1 * | 12/2007 | Burghardt et al. | 280/731 |
| 2008/0100040 A1 * | 5/2008 | DePottey et al. | 280/728.2 |
| 2008/0243342 A1 * | 10/2008 | Breed | 701/45 |
| 2008/0265550 A1 * | 10/2008 | Lisseman et al. | 280/728.2 |

(Continued)

FOREIGN PATENT DOCUMENTS

DE 101 50 275 A1 4/2003

(Continued)

OTHER PUBLICATIONS

Provisional Application, Lisseman et al. No. 60/907978, filed Apr. 25, 2007.*

(Continued)

*Primary Examiner* — Ruth Ilan
*Assistant Examiner* — Karen A Beck
(74) *Attorney, Agent, or Firm* — Foley & Lardner LLP (57) ABSTRACT

An airbag module includes a retainer, diffuser, inflatable airbag, and an inflator to inflate the airbag. The diffuser is configured to disperse inflation gas from the inflator into the inflatable airbag. The retainer and/or diffuser comprise a glass-filled polymer material. The retainer includes a projection extending from a base wall. The projection couples to a hole in the diffuser flange and prevents the diffuser from rotating relative to the retainer. The inflator is coupled to the retainer by trapping an inflator flange under an overhang in a retainer cavity.

15 Claims, 8 Drawing Sheets

U.S. PATENT DOCUMENTS

2009/0079167 A1* 3/2009 Shimazaki et al. ........ 280/728.2
2010/0219621 A1* 9/2010 Sasaki et al. .................. 280/731

FOREIGN PATENT DOCUMENTS

| DE | 20 2004 005 994 U1 | 6/2004 |
| --- | --- | --- |
| EP | 0 469 734 A1 | 2/1992 |
| EP | 0 857 622 A1 | 8/1998 |
| EP | 1 506 896 A1 | 2/2005 |
| GB | 2 270 045 A | 3/1994 |

OTHER PUBLICATIONS

Partial European Search Report mailed Sep. 17, 2009, received in European Application No. 08075569.7.

European Search Report mailed Feb. 5, 2010 in corresponding EP Application No. 08075569.7.

* cited by examiner

AIRBAG ASSEMBLY

CROSS-REFERENCE TO RELATED PATENT APPLICATIONS

This application claims priority to U.S. Provisional Application No. 60/929,349, filed Jun. 22, 2007, which is incorporated herein by reference in its entirety.

BACKGROUND

The present disclosure relates generally to the field of airbags. More specifically, the disclosure relates to a diffuser and a retainer for a steering wheel airbag module that are formed from a glass-polymer composite. The retainer and diffuser are configured to be coupled together without additional fastening members.

It is known to provide inflatable airbags in a vehicle. Inflatable airbags are inflated by gas directed into the airbag in response to a vehicle experiencing a sudden deceleration above a predetermined threshold or in response to other factors. The inflated airbag absorbs energy resulting from the movement of an occupant within the vehicle compartment against the airbag. The energy absorbed by the airbag is dissipated to minimize rebounding of the occupant from the airbag. Airbags may be provided at a variety of places within the vehicle to protect an occupant of the vehicle in a variety of impact scenarios. For example, airbags may be provided in the dashboard, proximate to the steering wheel, in the vehicle seats, in the door trim panels, in the headliner, etc. The steering wheel airbag assembly generally includes an inflator, an airbag that is inflated by the inflator, a diffuser, and a retainer that mechanically couples the airbag assembly to the vehicle, such as with threaded studs.

Figure 2:
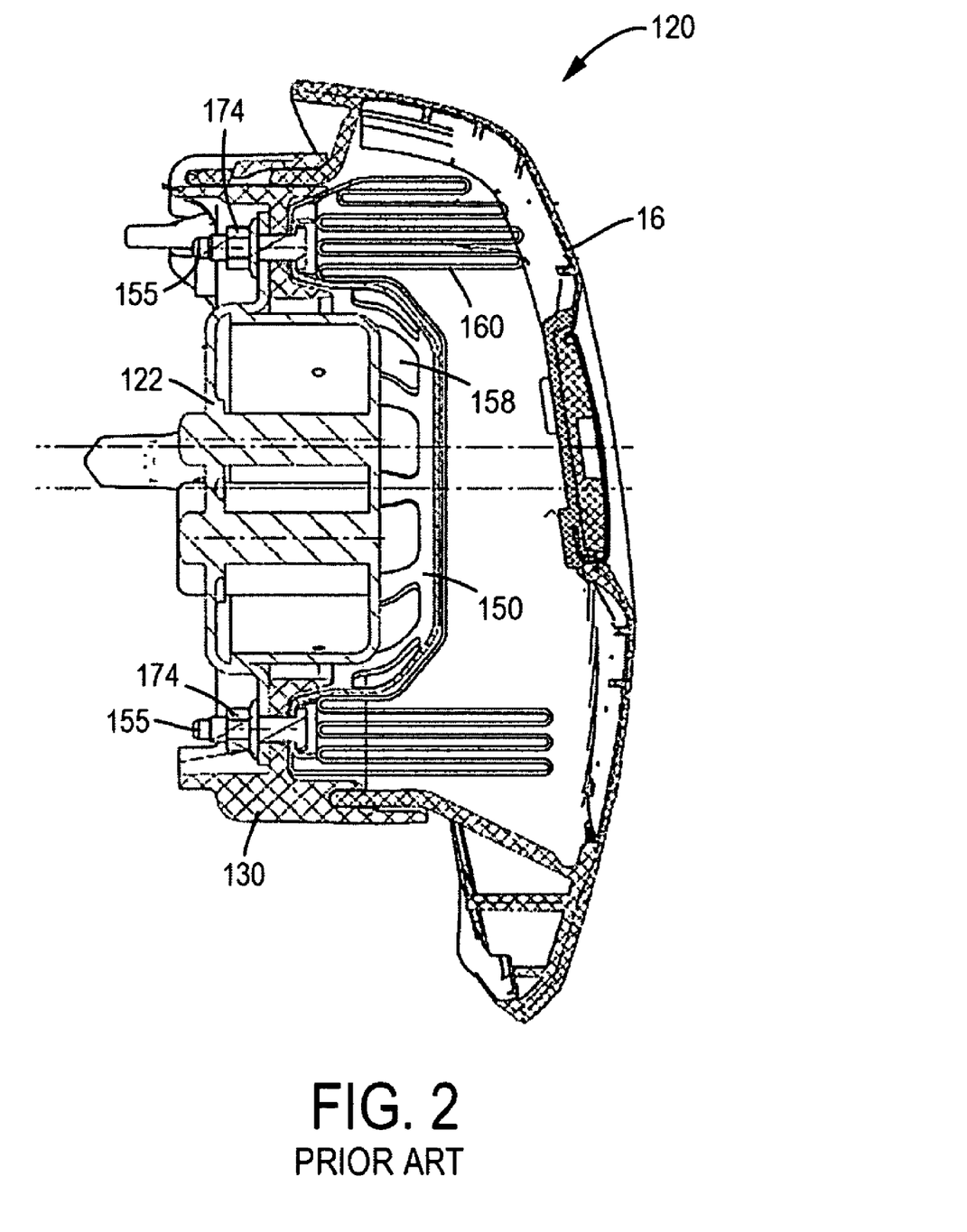
FIG. 2 is a cross section of an airbag assembly according to prior art.
Figure 3:
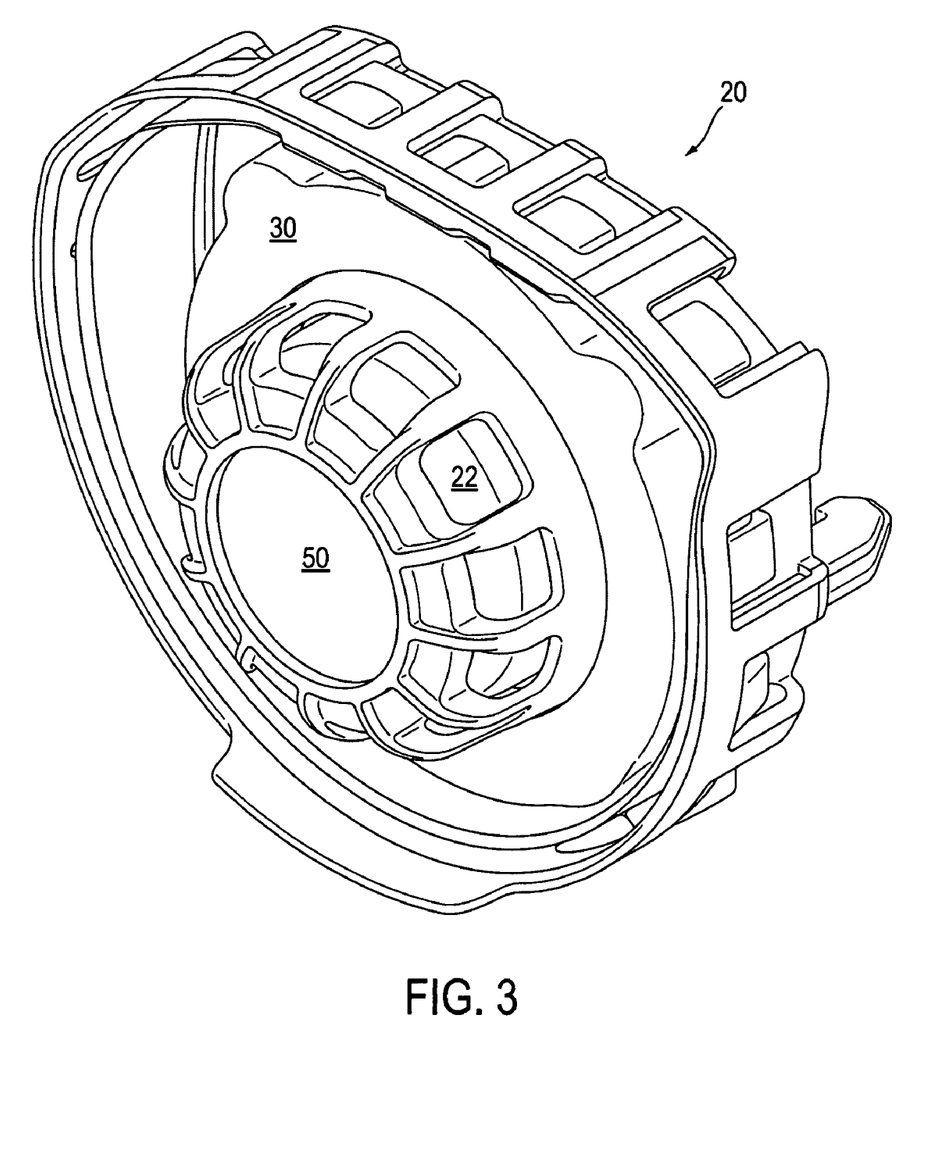
FIG. 3 is an isometric view of a portion of an airbag assembly according to an exemplary embodiment.
Figure 4:
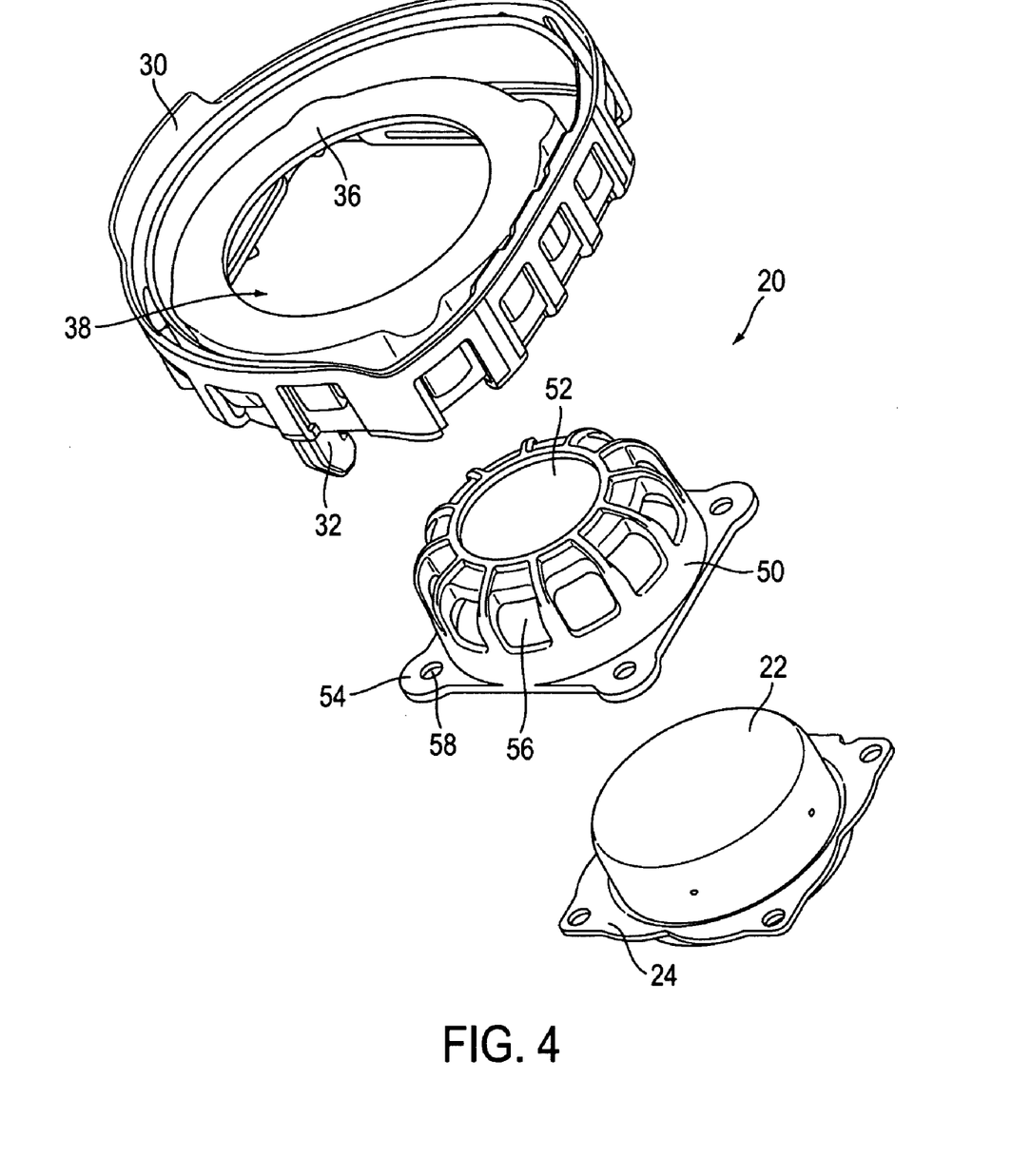
FIG. 4 is an exploded front view of the airbag assembly of FIG. 3.
Figure 5:
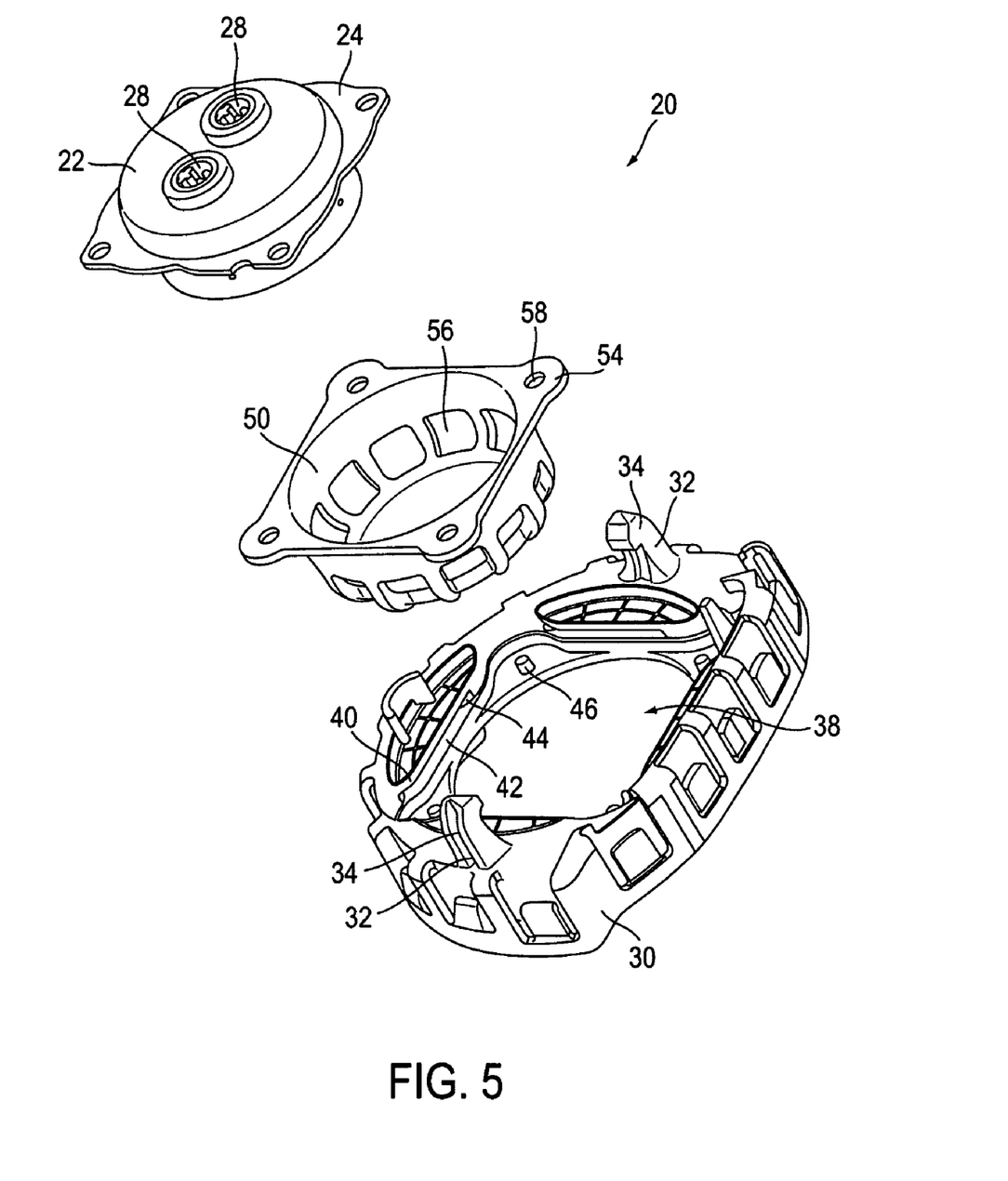
FIG. 5 is an exploded rear view of the airbag assembly of FIG. 3.

Referring to FIG. 2, a steering wheel airbag assembly 120 is shown according to prior art. Airbag assembly 120 includes an inflator 122, a diffuser 150, a retainer 130, and an airbag 160 (sometimes referred to as a "cushion"). Inflator 122 generates a gas that rapidly inflates airbag 160 in an impact. As the gas enters airbag 160, airbag 160 bursts through outer skin 16 and inflates between the driver 18 of vehicle 10 and steering wheel 12. Diffuser 150 is provided between inflator 122 and airbag 160. Diffuser 150 is a thin-walled metallic member that includes a multitude of slots or openings 158 and mounting studs 155. Openings 158 are configured to allow the gas produced by inflator 122 to expand into airbag 160. Mounting studs 155 are received by openings in retainer 130 and openings in inflator 122. The edges of airbag 160 are trapped between diffuser 150 and retainer 130. Nuts 174 are threaded onto studs 155 to couple retainer 130 to inflator 122, airbag 160, and diffuser 150. However, the bolted connection requires nuts 174, increasing the number of components in the assembly and the time needed to assemble airbag module 120.

It would be desirable to provide an airbag assembly that is less expensive and easier to assemble.

SUMMARY

One embodiment provides an airbag module. The airbag module comprises a retainer comprising a glass-filled polymer material, a diffuser coupled to the retainer and comprising a glass-filled polymer material, an inflatable airbag, and an inflator to inflate the airbag. The diffuser is configured to disperse inflation gas from the inflator into the inflatable airbag.

According to yet another embodiment, an airbag module is provided. The airbag module comprises a retainer, a diffuser with at least one flange, an inflatable airbag, and an inflator to inflate the airbag. The diffuser is configured to disperse inflation gas from the inflator into the inflatable airbag. The retainer includes at least one projection extending from a base wall. The at least one projection is configured to couple to a hole in the at least one flange of the diffuser and is configured to prevent the diffuser from rotating relative to the retainer. The inflator is configured to be coupled to the retainer by trapping at least one inflator flange under an overhang in at least one retainer cavity. The at least one retainer cavity being positioned about a periphery of a central opening of the retainer.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description and the accompanying exemplary embodiments shown in the drawings, which are briefly described below.

DETAILED DESCRIPTION

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

Figure 1:
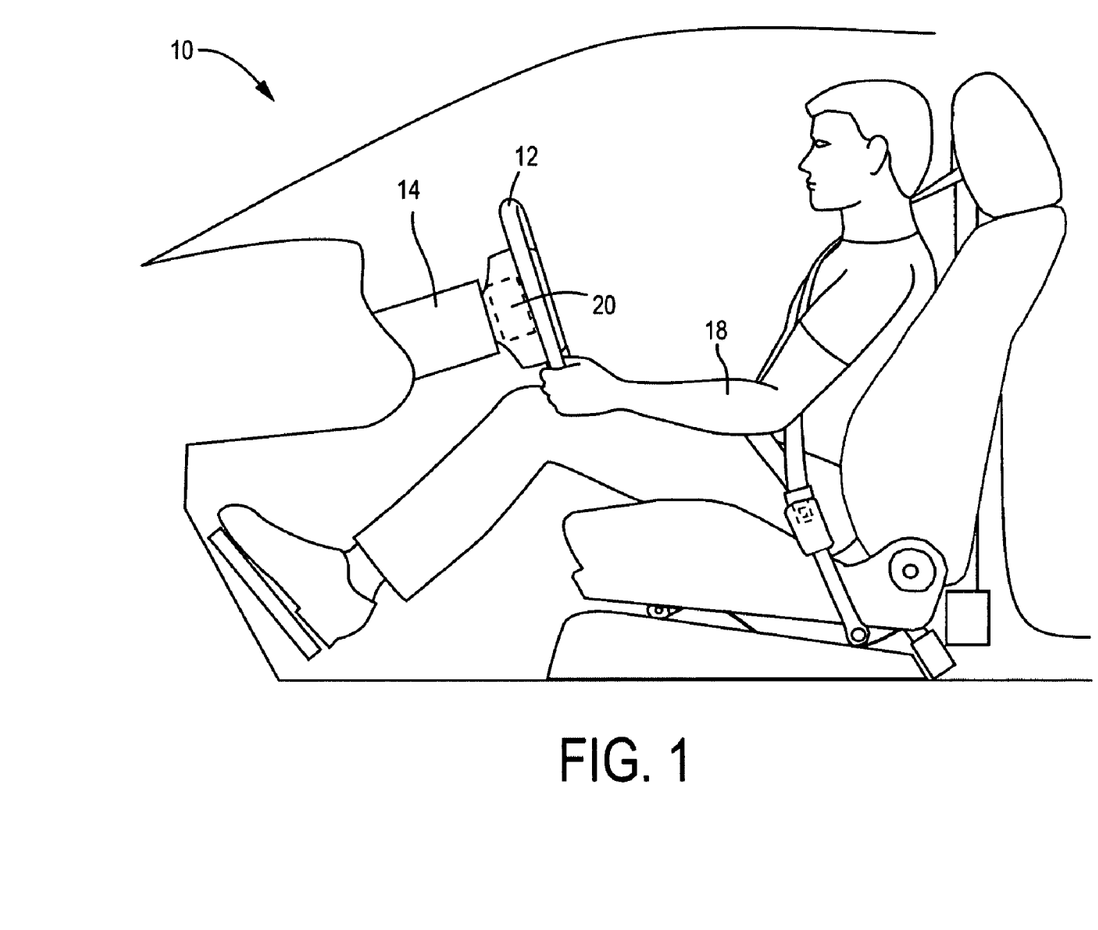
FIG. 1 is a side view of a vehicle interior including an airbag assembly according to an exemplary embodiment.

Referring to FIG. 1, a vehicle 10 is shown according to an exemplary embodiment. Vehicle 10 includes one or more seats that are configured to receive an occupant 18 and are coupled to vehicle 10. Airbags may be provided at a variety of places within vehicle 10 to protect an occupant 18 of the vehicle in a variety of impact scenarios. For example, airbags may be provided in the dashboard, proximate to the steering wheel, in the vehicle seats, in the door trim panels, in the headliner, etc. A steering wheel airbag assembly 20 is coupled to the steering column 14 and is configured to deploy through the outer skin or cover 16 (see FIG. 2) of the center of the steering wheel 12.

Referring in general to FIGS. 3-9, a portion of a steering wheel airbag module or assembly 20 is shown according to an exemplary embodiment. Airbag module 20 includes an inflator 22, a retainer 30, a diffuser 50, and an airbag or cushion 60 (shown in FIG. 9). Airbag module 20 does not require threaded studs and nuts or other separate components to couple it together. The steering wheel airbag assembly 20 may further include a retaining ring to couple the airbag 60 to the retainer 30.

Inflator 22 may be similar to inflator 122 of FIG. 2 and is a generally cylindrical body that includes outwardly extending flanges 24. According to an exemplary embodiment, inflator 22 includes four flanges 24 that are spaced symmetrically about the periphery of inflator 22. Alternatively, the inflator 22 can have a single rectangular flange, or any other number, size, or shape of flanges. Inflator 22 also includes plugs 28 on the back that are configured to be coupled to a sensor (not shown) that activates airbag module 20.

Diffuser 50 includes a domed portion 52, and outwardly extending flanges 54. According to one exemplary embodiment, diffuser 50 is formed from a reinforced polymer. Diffuser 50 is configured to nest with inflator 22. Diffuser 50 includes a multitude of vents or openings 56 formed in domed portion 52. According to various exemplary embodiments, the openings 56 may be larger or smaller and more or fewer openings 56 may be provided in diffuser 50. Diffuser 50 may include ribs or other strengthening features. The manufacturing costs of manufacturing composite diffuser 50 can be less than the manufacturing of metal diffuser 150 of FIG. 2.

Retainer 30 is a generally annular body that is configured to receive diffuser 50 and inflator 22 and to couple airbag module 20 to steering column 14. Retainer 30 couples airbag module 20 to steering column 14. According to an exemplary embodiment, retainer 30 includes two clips or latches 32 extending from a base wall 36. Clips 32 include enlarged or barbed heads 34 that are received by receiving sockets (not shown) provided on steering column 14, steering wheel 12, and/or cover 16. The receiving sockets may be, for example, spring-loaded. According to other exemplary embodiments, retainer 30 may include three or more clips 32. While the two clips 32 are shown generally on opposite sides of a central opening 38, according to other exemplary embodiments, they may be otherwise arranged. The clips 32 can snap into the receiving sockets on the steering column 14, steering wheel 12, and/or cover 16. Alternatively, the retainer 30 can couple to the steering column 14, steering wheel 12, and/or cover 16 by any suitable mechanism, such as by rivets, screws, glue, etc.

Central opening 38 in base wall 36 receives diffuser 50 and inflator 22. A multitude of posts 46 (e.g., studs, protrusions, projections, etc.) extend away from base wall 36 to provide locating features for diffuser 50. Slots or cavities 42 are provided symmetrically about the periphery of central opening 38 and are configured to receive inflator 22. Cavities 42 are defined by overhangs 40 (e.g., walls, flanges, ledges, etc.) integrally formed with the main body of retainer 30. The overhangs 40 may include a wall or stop 44 opposite of the open end.

Figure 6:
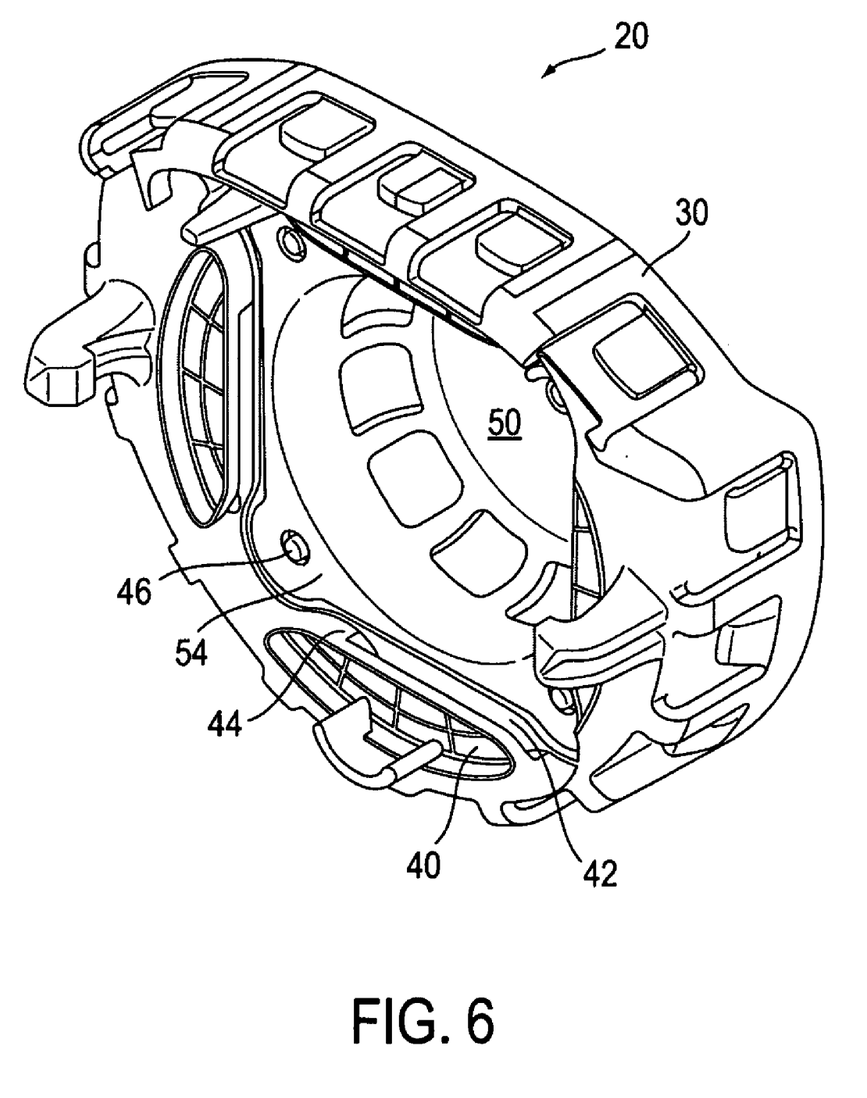
FIG. 6 is an isometric view of a portion of the airbag assembly of FIG. 3 showing the diffuser coupled to the retainer according to one exemplary embodiment.
Figure 9:
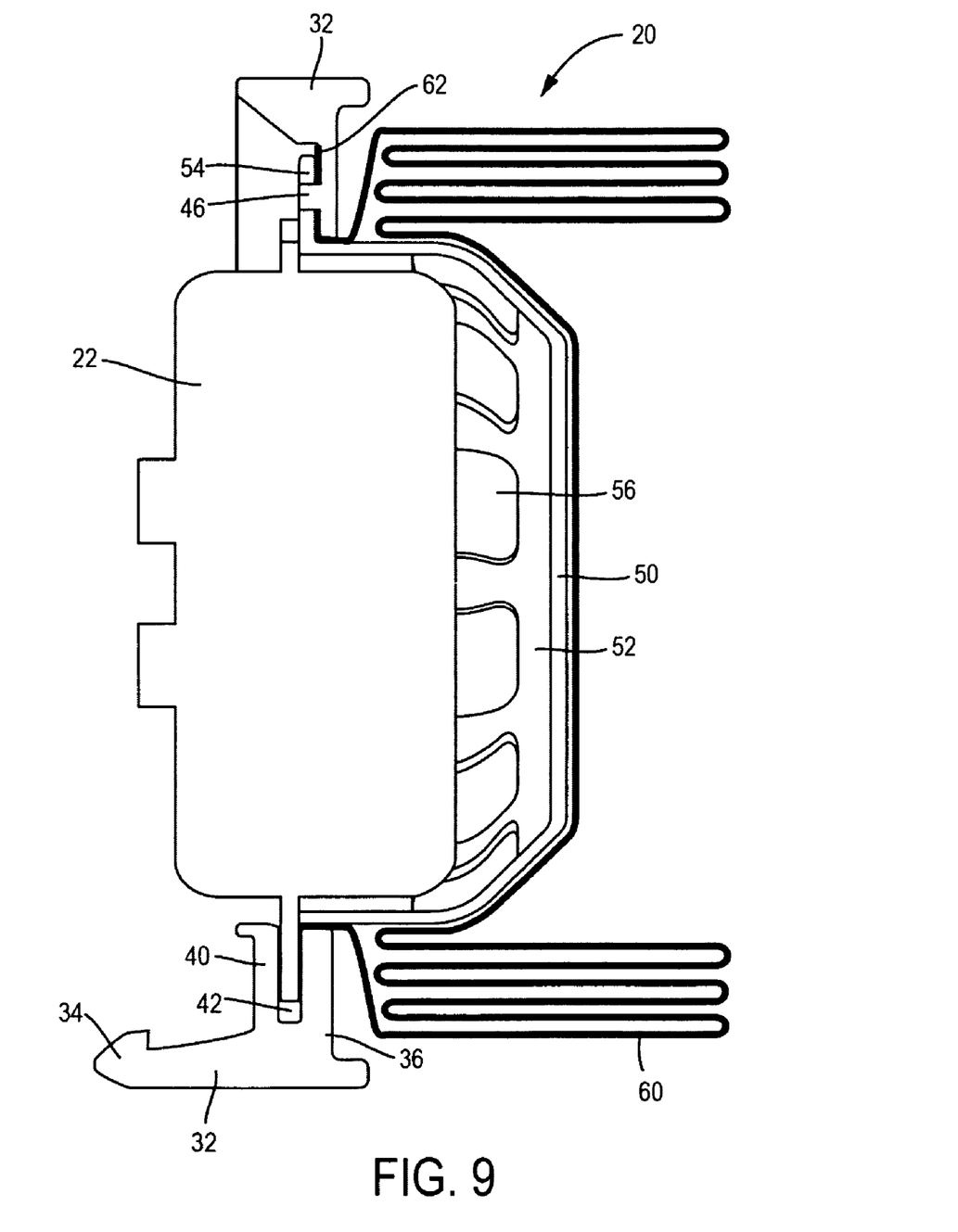
FIG. 9 is a cross section of the airbag assembly of FIG. 8 taken along line 9-9.

To assemble airbag module 20, domed portion 52 of diffuser 50 is inserted into central opening 38 of retainer 30, as shown in FIG. 6. Diffuser 50 is positioned so posts 46 are aligned with holes 58 in flanges 54. Holes 58 receive posts 46 to position diffuser 50 relative to retainer 30 and prevent diffuser 50 from rotating relative to retainer 30 when airbag module 20 is assembled. According to other exemplary embodiments, posts 46 may not be included and diffuser 50 may be located and retained by other features (e.g., flange geometry, bosses, ledges, etc.). The ends 62 of airbag cushion 60 are trapped between diffuser 50 and retainer 30 (FIG. 9).

Figure 7:
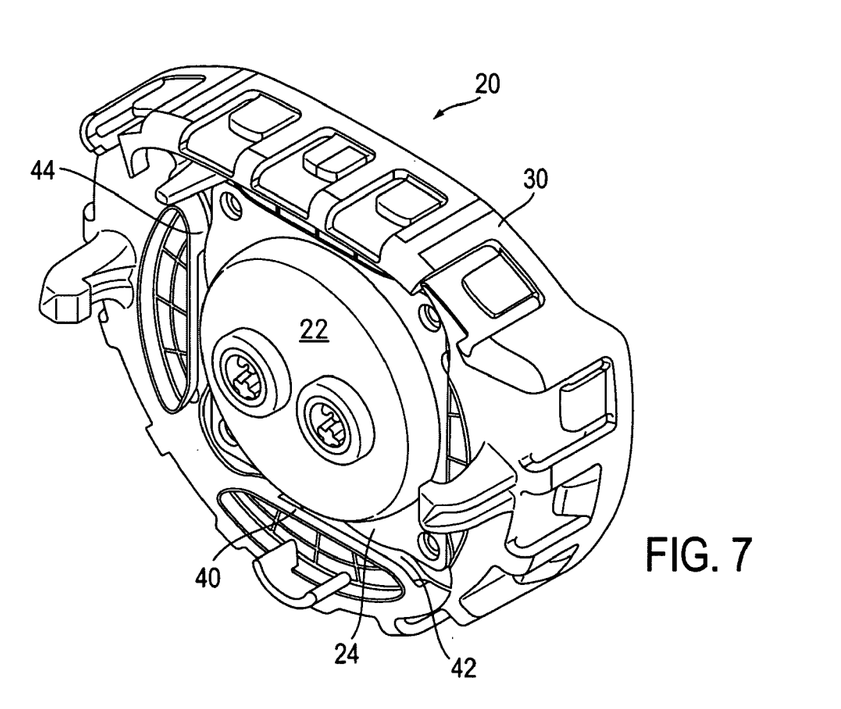
FIG. 7 is an isometric view of a portion of the airbag assembly of FIG. 3 showing the inflator before being coupled to the retainer according to one exemplary embodiment.
Figure 8:
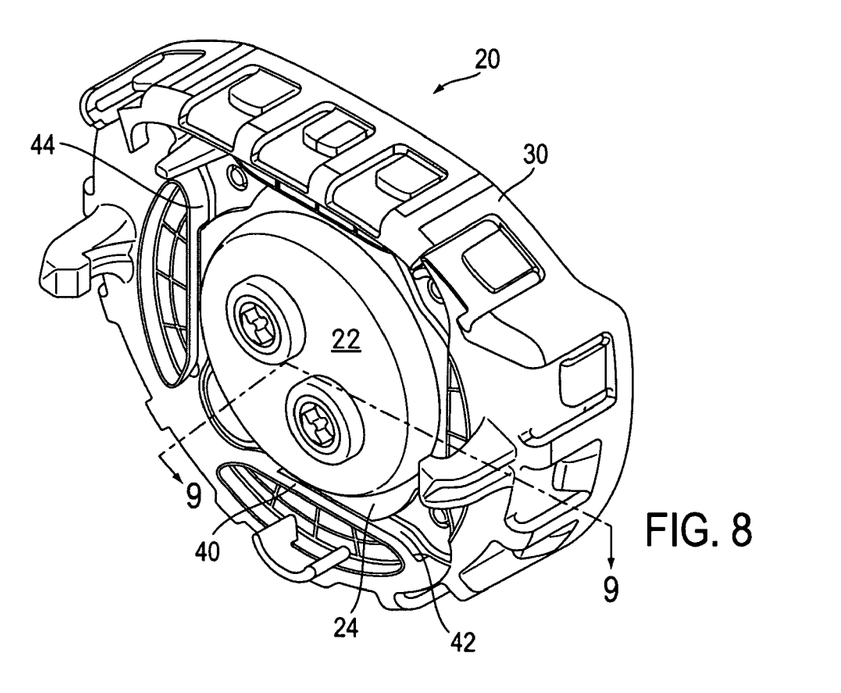
FIG. 8 is an isometric view of a portion of the airbag assembly of FIG. 3 showing the inflator coupled to the retainer according to one exemplary embodiment.

After diffuser 50 is seated in retainer 30, inflator 22 is nested within diffuser 50, with flanges 24 of inflator 22 generally aligned with flanges 54 of diffuser 50 as shown in FIG. 7. Inflator 22 is rotated to slide flanges 24 into cavities 42 as shown in FIG. 8. Stops 44 prevent inflator 22 from being over-rotated and help to retain flanges 24 in cavities 42. Inflator 22 is coupled to retainer 30 by flanges 24 trapped under overhangs 40. Diffuser 50 is, in turn, trapped between inflator 22 and retainer 30. In this way, airbag module 20 does not need threaded studs or other separate mechanical fasteners. Airbag module 20 of FIG. 3 can be assembled more quickly and includes fewer components compared to traditional airbag modules (such as module 120 of FIG. 2), reducing assembly costs.

According to one exemplary embodiment, retainer 30 and diffuser 50 are formed from a glass-filled polymer composite, or any other suitable polymer. Glass fibers are introduced into the plastic during an injection molding process. In one embodiment, the glass filled plastic material may be, for example, nylon. One exemplary nylon material is commercially available under the name Zytel™ by DuPont. According to other exemplary embodiments, the polymer may be any other suitable type of plastic material.

In one embodiment, the plastic material comprises a range of 10% to 70% glass. In a preferred embodiment, the plastic material comprises a range of 10% to 60% glass. Alternatively, the plastic material comprises a range of 10% to 50% glass. In a particularly preferred embodiment, the glass filled plastic material comprises 40% glass. For example, the material may be 40% glass reinforced nylon PA 6. In yet another embodiment, the plastic material comprises a range of 10% or higher of glass. In yet another embodiment, the plastic material comprises a range of 10% to 30% glass. According to still other exemplary embodiments, retainer 30 and diffuser 50 may be formed from another comparable composite material. It will be recognized that the diffuser 50 and retainer 30 need not comprise the same material. The diffuser 50 and retainer 30 may contain a glass filled polymer with different compositions of glass, or different polymers, or non-plastic materials.

Alternatively, retainer 30 and diffuser 50 may comprise a non plastic material, such as an aluminum alloy or magnesium alloy. The aluminum or magnesium alloys may be die cast to form retainer 30 and diffuser 50. In yet another embodiment, retainer 30 and diffuser 50 may be formed by a stamping process.

Conventionally, plastic was not considered to be a useful material for diffuser 50. Generally, a plastic diffuser was not used because the plastic was considered to be likely to fracture due to the hot inflation gases. However, diffuser 50 does not fracture and is able to withstand the hot inflation gases from the inflator.

Diffuser 50 formed from the composite is lighter than the comparable metal diffuser 150 of FIG. 2. Additionally, according to some embodiments, by using retainer 30 and diffuser 50 described above, no nut or fastener is needed to attach diffuser 50 to retainer 30.

Yet another advantage of diffuser 50 is that adjustments may be made to diffuser 50 and/or retainer 30 quickly, efficiently, and inexpensively by making only slight adjustments to the tooling process. For example, the size, position, and type of diffuser openings 56 and/or shape of retainer 30 can be changed easily, quickly, and inexpensively depending on the desired inflation results. Conventionally, changing the design of a metal diffuser was costly and time consuming.

The construction and arrangement of the elements of the airbag assembly as shown in the preferred and other exemplary embodiments is illustrative only. Although only a few embodiments of the present airbag assembly have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in this disclosure. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present application.

What is claimed is:

1. An airbag module, comprising:
a retainer comprising a glass-filled polymer material;
a diffuser coupled to the retainer, the diffuser comprising a glass-filled polymer material;
an inflatable airbag; and
an inflator to inflate the airbag,
wherein the diffuser is configured to disperse inflation gas from the inflator into the inflatable airbag,
wherein the retainer includes at least one cavity positioned about a periphery of a central opening, the at least one cavity being defined by an overhang formed in a main body of the retainer, and
wherein the overhang includes an open end portion at one end of the cavity to permit entrance of a flange into the at least one cavity, and wherein the overhang includes a stop opposite the open end portion configured to prevent over-rotation of the flange.

2. The airbag module of claim 1, wherein the glass-filled polymer material of one or both the retainer and diffuser comprises glass filled nylon.

3. The airbag module of claim 1, wherein the glass-filled polymer material of one or both the retainer and diffuser comprises 40% glass.

4. The airbag module of claim 1, wherein the glass-filled polymer material of one or both the retainer and diffuser comprises a range of 10% to 70% glass.

5. The airbag module of claim 1, wherein the glass-filled polymer material of one or both the retainer and diffuser comprises a range of 10% to 60% glass.

6. The airbag module of claim 1, wherein the glass-filled polymer material of one or both the retainer and diffuser comprises a range of 10% to 50% glass.

7. The airbag module of claim 1, wherein the glass-filled polymer material of one or both the retainer and diffuser comprises a range of 10% to 30% glass.

8. The airbag module of claim 1, wherein the retainer includes a base wall and at least one latch extending from the base wall, the at least one latch being configured to couple the retainer to a vehicle body component.

9. The airbag module of claim 8, wherein the retainer further includes at least one unitary projection extending from and integral with the base wall, the at least one projection being configured to couple to holes in flanges of the diffuser and to prevent the diffuser from rotating relative to the retainer without being a separate component to couple the diffuser and retainer together.

10. The airbag module of claim 1, wherein the inflator is configured to couple to the retainer by trapping the flange under the overhang in the at least one cavity.

11. An airbag module, comprising:
a retainer;
a diffuser with at least one flange;
an inflatable airbag; and
an inflator to inflate the airbag,
wherein the diffuser is configured to disperse inflation gas from the inflator into the inflatable airbag,
wherein the retainer includes at least one unitary projection extending from and integral with a base wall, the at least one projection being configured to couple to a hole in the at least one flange of the diffuser and configured to prevent the diffuser from rotating relative to the retainer without being a separate component to couple the diffuser and retainer together, and
wherein the inflator is configured to be coupled to the retainer by trapping at least one inflator flange under an overhang in at least one retainer cavity, the at least one retainer cavity being positioned about a periphery of a central opening of the retainer.

12. The airbag module of claim 11, wherein the retainer includes at least one latch extending from the base wall, the at least one latch being configured to couple the retainer to a vehicle body component.

13. The airbag module of claim 11, wherein the overhang includes an open end portion at one end of the at least one retainer cavity to permit entrance of the at least one inflator flange into the at least one retainer cavity, and wherein the overhang includes a stop opposite the open end portion configured to prevent over-rotation of the at least one inflator flange.

14. The airbag module of claim 11, wherein the diffuser is positioned between the inflator and retainer.

15. The airbag module of claim 11, wherein at least one of the diffuser and retainer comprises a glass-filled polymer material.

* * * * *